No. 773,530.                                    Patented October 25, 1904.

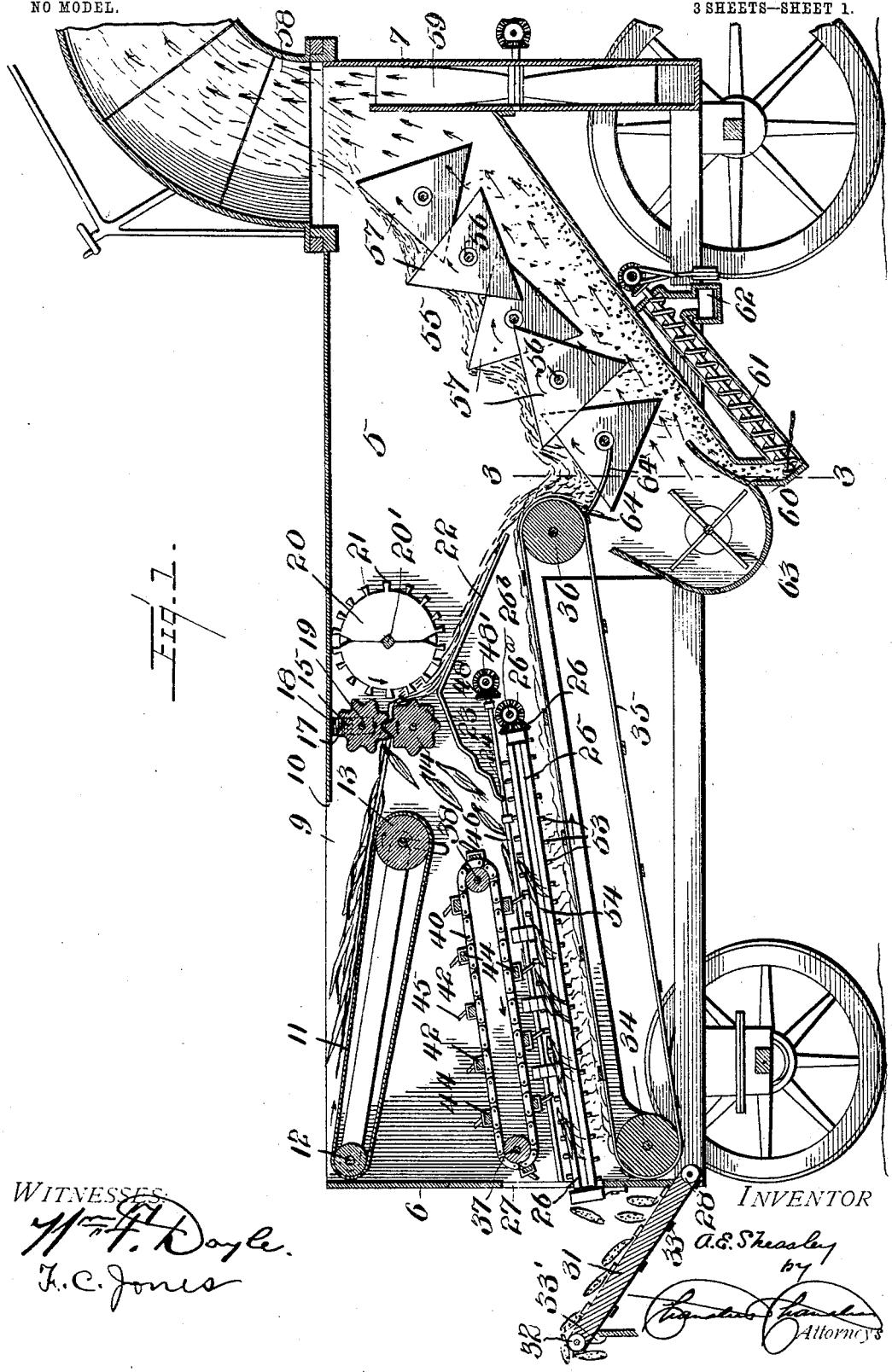

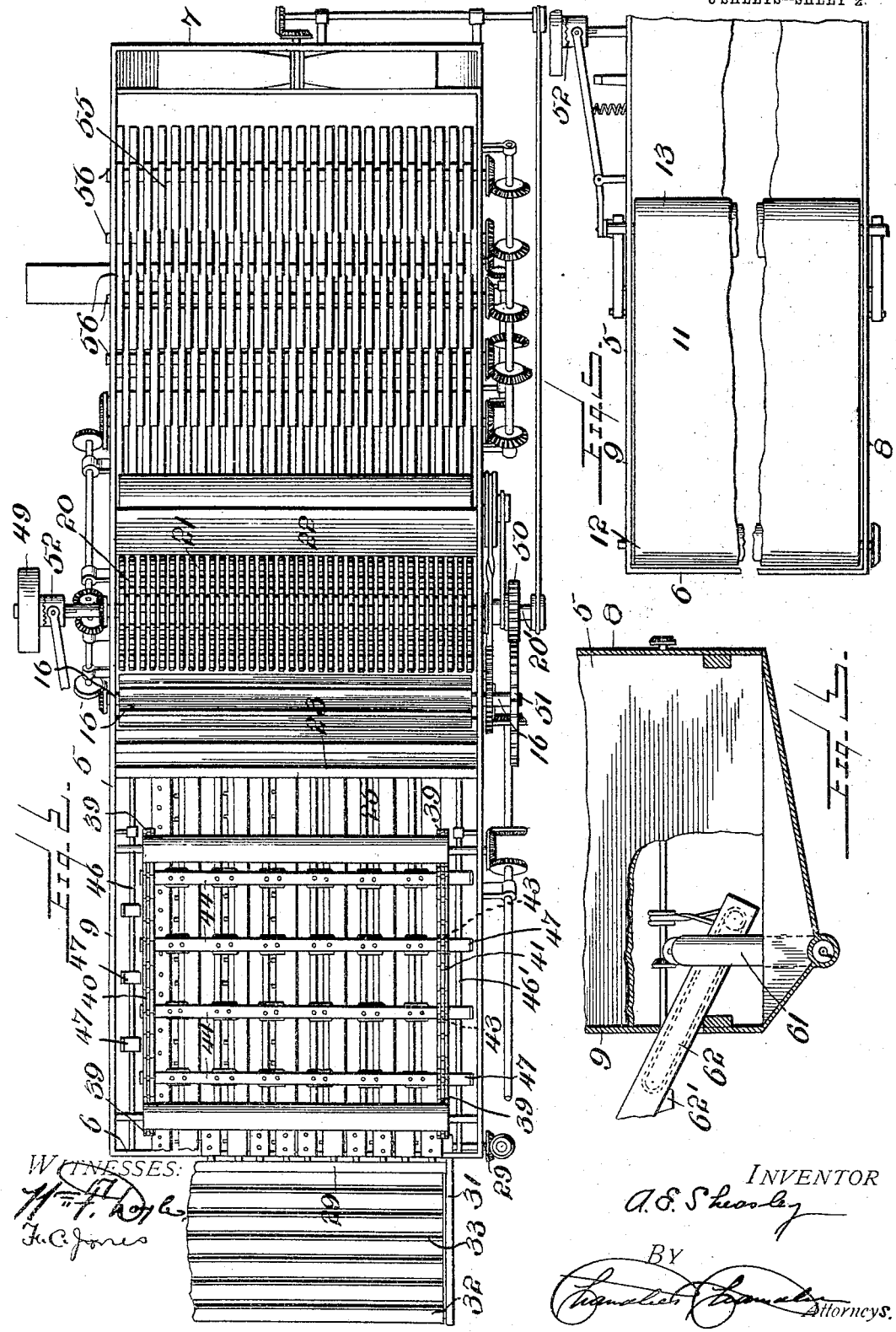

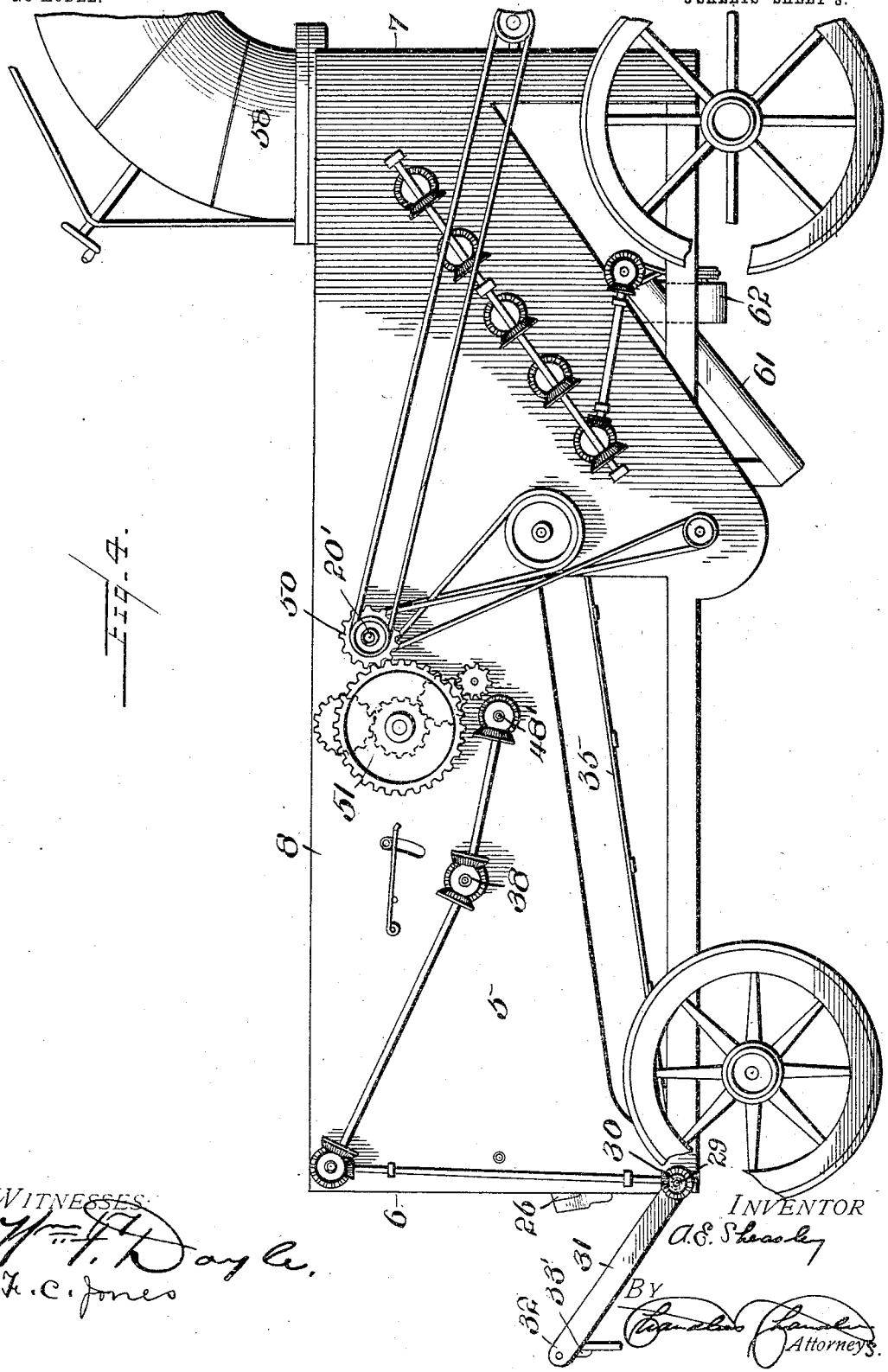

UNITED STATES PATENT OFFICE.

ARLINGTON E. SHEASLEY, OF KITTANNING, PENNSYLVANIA.

HUSKER AND SHREDDER.

SPECIFICATION forming part of Letters Patent No. 773,530, dated October 25, 1904.

Application filed February 11, 1904. Serial No. 193,132. (No model.)

*To all whom it may concern:*

Be it known that I, ARLINGTON E. SHEASLEY, a citizen of the United States, residing at Kittanning, in the county of Armstrong, State of Pennsylvania, have invented certain new and useful Improvements in Huskers and Shredders; and I do hereby declare the following to be a full, clear, and exact description of the invention, such as will enable others skilled in the art to which it appertains to make and use the same.

The invention relates to corn-husking and fodder-cutting machines, and has for its object to provide a device of this nature which will remove the ears from the stalks, husk the ears, cut and shred the stalks, and which will deliver both husks and shredded stalks into a silo.

A further object is to provide a mechanism which will separate loose grains from the cut fodder or ensilage to prevent souring of the mass through fermentation of the grains.

In the drawings forming a portion of this specification, and in which like numerals of reference indicate similar parts in the several views, Figure 1 is a longitudinal section of the machine, showing the working parts in elevation. Fig. 2 is a top plan view of the working parts. Fig. 3 is a section on line 3 3 of Fig. 1. Fig. 4 is a side elevation of the complete machine. Fig. 5 is a top plan view of a portion of the machine.

Referring now to the drawings, the present invention comprises a body portion 5, including ends 6 and 7, sides 8 and 9, and top and bottom, the body being mounted on wheels, as shown. At its rearward end the top has an opening 10 therethrough, and directly therebelow there is disposed a conveyer 11, mounted upon transverse rollers 12 and 13, journaled in the sides of the body. The roller 13 is disposed below and forwardly of the roller 12, so that the conveyer slants downwardly and forwardly into the machine. Transversely of the body and disposed forwardly of the roller 13 and spaced therefrom are a pair of intermeshing star-shaped snapping-rollers 14 and 15, the roller 15 of which is disposed with its trunnions 16 in slots 17 in the sides 8 and 9 of the body, and the trunnions are held normally at the lower extremities of the slots by helical springs 18, disposed between bearing-blocks 19, which rest upon the trunnions and the upper ends of the slots.

Forwardly of the snapping-rollers there is journaled transversely of the body a shredding-roller 20, which has a plurality of knives 21 arranged upon its face. This roller is spaced slightly from the snapping-rollers, and below the space there lies the upper end of a downwardly and forwardly inclined plane 22. A similar inclined plane 23 is disposed with its upper end below the rollers 14 and 15 and extends rearwardly thereof. Below the lower end 24 of the plane 23 are the ends of a plurality of rollers 25, disposed longitudinally of the body and which extend downwardly and rearwardly therein, the lower ends 26 extending outwardly of the casing through an opening 27 in the end 6. As shown, these rollers have intermeshing gears 26' at their ends and are connected by a bevel-gear $26^a$ to a transverse power-shaft $26^b$.

At the lower rearward corner of the body below the outwardly-extending ends 26 of the rollers 25 there is journaled a transverse roller 28, the trunnions 29 of which extend through openings 30 in the sides 8 and 9, these openings acting as bearings therefor. To the outer ends of the trunnions 29 are pivoted braces 31, which carry at their free ends a roller 32. This roller, with the roller 28, carries a conveyer 33, and by reason of the pivotal connection of the braces 31 and the trunnions 29 the roller 32 may be moved in an arc to lie against the end 6 or to project at an angle therefrom. The free ends of the braces are provided with hooks $33^a$ for engagement with the sides of a wagon. Adjacent to the end 6 there is journaled transversely of the body a roller 34, which supports one end of an upwardly and forwardly extending conveyer 35, the other end of which is supported by a roller 36, which lies below the lower end of the inclined plane 22.

Arranged above the rollers 25 are a pair of shafts 37 and 38, carrying sprockets 39, with which are engaged chains 40 and 41. To the outer faces of the chain 40 are attached a plurality of yokes 42, which aline with similar yokes 43 on the chain 41, and in each alining pair of yokes there are disposed plates 44, which are considerably longer than the distance between the chains. From the outer faces of the plates 44 there extend at an angle thereto a plurality of sharpened pins 45. The chains 40 and 41 are spaced somewhat from the sides 8 and 9 of the body, and in each of these spaces and parallel to the chains there is mounted a shaft, the shafts being designated by the numerals 46 and 46', respectively. Each shaft has a plurality of laterally-extending fingers 47, arranged in pairs at opposite points upon the sides thereof, all of which fingers lie in a single plane. The shafts 46 and 46' are connected, by means of beveled gears 48', to the shaft 38, as shown.

The shaft 20' of the roller 20 extends outwardly of the body and carries at one end a belt-wheel 49, with which may be engaged a belt from a traction-engine or other source of power. The shaft 20' is also connected, by means of a gear 50, with a gear 51, carried by one of the trunnions 16 of the roller 15, the remaining trunnion being connected in a similar manner with the roller 13. The remaining rollers, conveyers, &c., are connected one with another in a similar manner by belts, gears, or in any desired way to move the different portions of the mechanism in the directions indicated by their respective arrows, (shown on the drawings,) all of the different portions receiving their power directly or indirectly from the shredding-roller 20, which is provided with a clutch mechanism 52, by means of which the entire machine may be thrown out of gear.

In operation cornstalks are introduced buttend first into the opening 10 and are carried forwardly by the conveyer 11 until their ends are engaged by the rollers 14 and 15, when the stalks will be drawn inwardly therebetween and crushed by the intermeshing portions of the rollers. As the stalks emerge rearwardly of the rollers they are struck by the knives 21 and are chopped into small pieces, which fall upon the inclined plane 22, down which they pass. With the passage of the stalks between the rollers 14 and 15 the ears of corn are snapped therefrom and fall upon the plane 23, from which they slide to the rollers 25. These rollers are provided with a plurality of hooked pins 53, which are arranged in rows longitudinally of the rollers, the rows alternating circumferentially of the rollers, as shown. Between each pair of pins the surfaces of the rollers are provided with slots 54, and the rollers are so disposed that the pins of one roller register with the slots of the adjacent rollers. When the ears reach the rollers 25, the husks are engaged by the pins 53, which pull them from the ears, after which they are carried downwardly between the rollers 25 to the conveyer 35. To aid in husking the ears, the rollers 37 and 38 and the mechanism carried thereby are provided. It will be apparent from the drawings that as the ears pass along the rollers 25 they will be engaged by the pins 45, which will catch in the husks and tend to loosen them. The arrangement of the shafts 46 and 46' is such that when they are rotated the fingers 47 strike the ends of the plates 44, moving them in the yokes 42 and 43, the fingers of the shaft striking alternate plates, which gives the plates a reciprocating motion, they being engaged first by the fingers of one shaft and then by those of the other. This reciprocating motion of the plates acts, in connection with their movement longitudinally of the machine, to aid the pins 53 in removing the husks from the ears. After the husking operation the ears fall from the ends 26 of the rollers 25 to the conveyer 33.

It will be understood that any loose grains which may fall from the ears will pass between the rollers 25 to the conveyer 35 and will with the husks be carried to the end of the inclined plane 22. At this point the husks mingle with the chopped fodder and are deposited with it upon a screening and elevating mechanism 55, which is of peculiar construction. This mechanism consists of a plurality of transverse shafts 56, journaled in the sides 8 and 9, which are arranged in an upwardly and forwardly directed line. These shafts are geared together to rotate in the direction of the end 7, as indicated by the arrow. Each shaft carries a number of triangular plates 57, which are spaced slightly from each other, the edges of the plates of one shaft lying between those of the adjacent shafts. The plates carried by the lowermost shaft lie below the end of the conveyer 35 and receive the ensilage therefrom. As will be apparent from Fig. 1 of the drawings, the forward rotation of these plates deposits the fodder upon the plates of the next shaft, and this operation is repeated until the fodder reaches the uppermost plates, from which it passes into the chute 58 of a blower 59, through which it passes to a silo or other receptacle.

It will be seen that the fodder in its passage over the mechanism 55 is thoroughly agitated, so that any loose grains of corn will pass between the plates 57 to a chute 59 therebelow and down this to an opening 60, where they enter a rotary conveyer 61 and are carried to an elevator 62, which empties them from the machine through a chute 62', to which a sack may be attached. At the lower end of the chute 59 there is a fan 63, which separates any chaff and waste matter that may pass through the plates 57 from the corn.

Arranged transversely of the body and just below the conveyer 35 is a rod 64, which has a series of teeth 64' projecting therefrom and lying between the plates 57 of the lowermost shaft to prevent the fodder from falling from the rearward edges thereof.

In practice modifications of the specific construction shown may be made, and any suitable proportions and materials may be used without departing from the spirit of the invention.

What is claimed is—

1. In a corn-husker and fodder-cutter, the combination with a body portion having an opening, and a conveyer disposed below the opening, of snapping-rollers disposed to receive stalks from the conveyer and for the passage of said stalks therebetween, a knife-roller disposed for engagement of its knives with the stalks to chop the latter, husking-rollers disposed to receive the ears from the snapping-rollers, plates disposed above the husking-rollers and having pins for engagement of the ears, means for moving the plates bodily, longitudinally of the husking-rollers, means for reciprocating the plates transversely of the rollers, a conveyer disposed to receive the husked ears from the rollers, a conveyer disposed to receive the husks and loose grains from the rollers, a conveyer disposed for the reception of the husks and grains from the first-mentioned conveyer, a chute disposed for the passage thereover of the chopped stalks from the knife-roller to the second-named conveyer, said second-named conveyer comprising a plurality of transverse shafts arranged in an upwardly-extending diagonal plane, each shaft having a plurality of triangular plates mounted thereon and spaced slightly from each other, the plates of one shaft lying between those of the adjacent shafts, the shafts being arranged for movement in the same direction, the plates being arranged to deposit one upon another the husks, chopped stalks and loose grains, and being disposed for the passage of loose grains therebetween, inwardly-projecting fingers disposed between the plates of the lowermost shaft and extending above said plates to prevent fodder from falling therefrom, and a discharge-chute arranged to receive fodder from the uppermost plates.

2. In a corn-husking and fodder-cutting machine, the combination with ear-removing, husking and chopping mechanism, of a combined elevator and separator comprising a plurality of shafts disposed in an upwardly-directed diagonal line, a plurality of triangular plates mounted upon each shaft and spaced slightly from each other, the plates of one shaft lying between those of the adjacent shafts, said shafts being arranged for movement in the same direction, the plates being arranged to receive and deposit one upon another, fodder and loose grains from the chopping and other mechanism, the plates being disposed for the passage of loose grain therebetween, inwardly-projecting fingers disposed between and projecting above the plates of the lowermost shaft, to prevent the fodder from falling from the plates and a discharge-chute arranged to receive fodder from the uppermost plates.

In testimony whereof I affix my signature in presence of two witnesses.

ARLINGTON E. SHEASLEY.

Witnesses:
NISH D. HEILMAN,
ROBERT WATERSON.